Patented June 16, 1925.

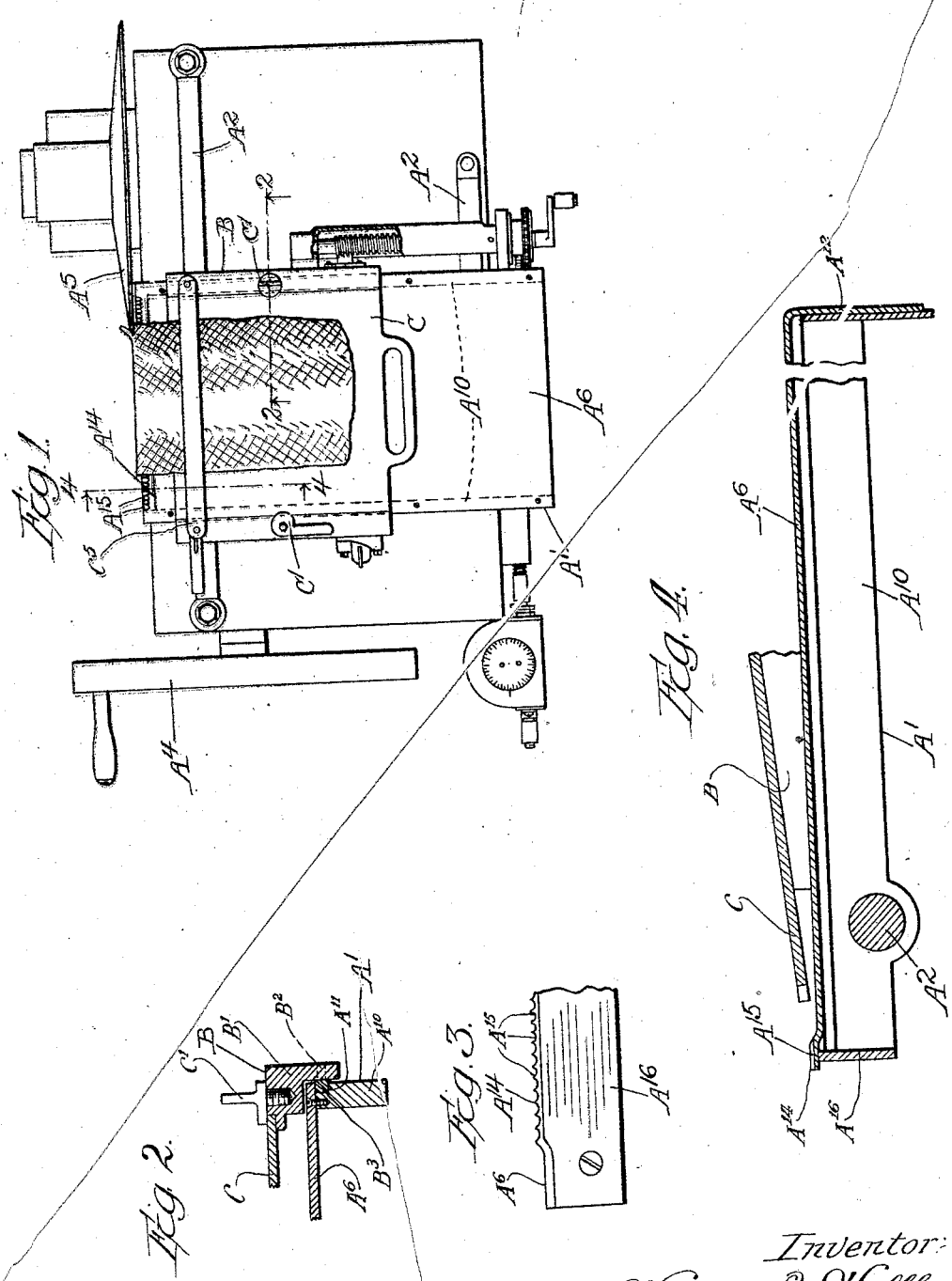

1,541,885

UNITED STATES PATENT OFFICE.

WALLACE B. WOLFF, OF CHICAGO, ILLINOIS.

SLICING MACHINE.

Application filed August 25, 1924. Serial No. 733,894.

*To all whom it may concern:*

Be it known that I, WALLACE B. WOLFF, a citizen of the United States, residing at Chicago, in the county of Cook and State of Illinois, have invented a certain new and useful Improvement in Slicing Machines, of which the following is a specification.

My invention relates to a meat slicing machine, and particularly to a slicing machine of the type wherein a meat carrier is reciprocated back and forth past a circular rotating knife, the meat carrier proper being fed forward in the course of and as the result of such reciprocation so that a slice of substantially uniform thickness is removed in the course of each reciprocation. I have for one object the provision of means for supporting the lower edge of the material being sliced to insure a slice of uniform thickness. Another object is the provision of means for grasping the lower edge of the material being sliced to prevent its displacement upon the carrier. Another object is to provide means for elevating the lower edge of the material being sliced above the general level of the meat support. Other objects will appear from time to time in the course of the specification and claims.

I illustrate my invention more or less diagrammatically in the accompanying drawings, wherein—

Figure 1 is a plan view;

Figure 2 is a section on the line 2—2 of Figure 1;

Figure 3 is a partial front view illustrating the front plate of the meat carriage and the outer edge of the main meat plate;

Figure 4 is a section on an enlarged scale along the line 4—4 of Figure 1.

Like parts are illustrated by like characters throughout the specification and drawings.

A is a slicing machine frame or supporting structure across which reciprocates the carriage $A^1$ which slides on the tracks or bars $A^2$, $A^2$. The carriage $A^1$ is adapted to reciprocate in response to the rotation of the drive wheel $A^4$. $A^5$ is a concave cutting disc adapted to rotate in response to the rotation of the wheel $A^4$. $A^6$ is a surface plate connecting the two sides of the carriage $A^1$, and is secured upon it by any suitable means, and rests upon the top of the side elements $A^{10}$ of the carriage. These sides elements are grooved or slotted as at $A^{11}$, the outer edge of the plate $A^6$ serving as the upper wall of said groove or channel. The plate $A^6$ may be downwardly turned at its rear as at $A^{12}$. Its forward edge is upwardly offset as at $A^{14}$ from the body of the plate. The upwardly off-set portion, may, if desired, terminate short of the side edges of the plate, as shown in Figure 3. It is grooved or corrugated as at $A^{15}$. $A^{16}$ is the front plate of the carriage, the upper edge of which conforms to it in shape.

B is a forwardly inclined meat support adapted to slide along the carriage $A^1$, but out of contact with the upper edge of the plate $A^6$. It may consist, for example, of the side elements or tracks $B^1$ with the downwardly depending flanges $B^2$ in which are fixed the elements $B^3$ which penetrate the slots $A^{11}$ along the sides of the carriage $A^1$. The meat carrying plate proper C, rests thereupon and may be held in position, for example by the thumb screw or similar elements $C^1$ or any other suitable clamping means. The meat is supported directly upon the plate C, it being clamped thereupon, for example, by any suitable clamp $C^5$, the details of which form no part of the present invention.

It will be realized that while I have illustrated a working mechanism, many changes might be made in the size, shape, number and disposition of parts without departing from the spirit of my invention, and I do not wish my claims to be limited to the specific structure or the specific type of slicing machine herein shown.

The use and operation of my invention are as follows:

In the slicing machines heretofore used of the general type herein disclosed, it frequently happens that the slice is uneven. This unevenness may result from various causes. There may be a lateral displacement of the meat along the forward edge of the meat carriage. When the inclined meat support plate is adjusted to position closely adjacent the edge of the carriage, the meat resting upon the plate is spaced substantially above the upper surface of the carriage, and consequently, the lower edge of the meat lacks adequate support. I deal with both of these problems, by upwardly offsetting the forward edge of the plate and by corrugating or roughening the upwardly offset portion. Lateral displacement of the meat along the edge of the carriage is prevented by the corrugations. The upwardly off-set portion serves as a support for the meat when the front edge of the carrier B or the plate C approaches the forward edge of the carriage. Thus the slices are as uniform in thickness, both in relation to each other and to the various parts of each slice when the support B is pushed forward as when it is withdrawn from the front edge of the carriage.

One of the foremost problems of the slicing machine art is the provision of a machine which shall be sanitary, which shall eliminate the gathering of meat fragments in inaccessible places, and their subsequent putrefaction. I have therefore developed a top plate for the meat supporting carriage which extends over the entire upper surface of the carriage and which therefore leaves no slot or aperture or separation between parts into which small fragments of meat can penetrate. The plate $A^6$ as shown in Figure 2, extends from side to side of the meat carriage, its outer edge forming the upper flange of the track or slot $A^{11}$. It is downwardly turned at the rear of the carriage and at the front of the carriage it extends forwardly beyond the carriage front plate $A^{16}$. Thus there is no aperture into which meat can penetrate. Furthermore, the plate $A^6$ is composed of a non-corrosive metal and thus neither the meat being cut, nor the small fragments and crumbs incidental to the cutting can come in contact with a corrosive metal or a metal or material which is affected by the meat or which can in turn affect the meat which contacts it.

I claim:

1. In a slicing machine comprising a cutting element, a meat carriage and a meat support mounted upon said carriage and adapted to be moved forwardly thereupon, a cover for said carriage comprising a single plate covering the entire top thereof, the forward edge of said plate adjacent the cutting element being upwardly off-set above the rest of the plate.

2. In a slicing machine comprising a cutting element, a meat carriage and a meat support mounted upon said carriage and adapted to be moved forwardly thereupon, a cover for said carriage, comprising a single plate covering the entire top thereof, the forward edge of said plate adjacent the cutting element being upwardly off-set above the rest of the plate, said upwardly off-set portion being corrugated.

3. In a slicing machine comprising a cutting element, a meat carriage and a meat support mounted upon said carriage and adapted to be moved forwardly thereupon, a top plate for said meat carriage, the edge of said plate adjacent the cutting element being upwardly off-set above the rest of the plate, said off-set portion terminating a substantial distance from the sides of the edge of the plate.

4. In a slicing machine comprising a cutting element, a meat carriage and a meat support mounted thereupon and adapted to be moved forwardly thereupon, a cover for said meat carriage comprising a single plate covering the entire top of the carriage, the sides of the carriage being channelled, bearing elements downwardly depending from said meat support and adapted to penetrate in and ride along said channels, the tops of said channels being formed by the outwardly projecting edges of said cover plate.

5. In a slicing machine comprising a cutting element, a meat carriage and a meat support mounted thereupon, and adapted to be moved forwardly thereupon, a cover for said meat carriage comprising a single plate covering the entire top of the carriage, said plate extending forwardly above and beyond the front of the carriage frame and being downwardly turned about the rear edge of the carriage frame.

6. In a slicing machine comprising a cutting element, a meat carriage and a meat support mounted thereupon, and adapted to be moved forwardly thereupon, a cover for said meat carriage comprising a single plate covering the entire top of the carriage, said plate extending forwardly above and beyond the front of the carriage frame and being downwardly turned about the rear edge of the carriage, its forward edge being upwardly off-set from the body of the plate, the off-set portion being corrugated.

Signed at Chicago, county of Cook and State of Illinois, this 11th day of August, 1924.

WALLACE B. WOLFF.